United States Patent [19]

Massholder et al.

[11] Patent Number: 5,336,842
[45] Date of Patent: Aug. 9, 1994

[54] PROCESS AND DEVICE FOR CLEANING POLLUTED SOLIDS

[75] Inventors: Karl F. Massholder, Altneudorf; Wilfried Werz, Schriesheim, both of Fed. Rep. of Germany

[73] Assignee: Ultra Systems GmbH UV-Oxidation, Heidelberg, Fed. Rep. of Germany

[21] Appl. No.: 880,655

[22] Filed: May 11, 1992

[30] Foreign Application Priority Data

May 9, 1991 [DE] Fed. Rep. of Germany ....... 4115177

[51] Int. Cl.$^5$ ............................ B01J 8/18; A61L 2/10
[52] U.S. Cl. .................................... 588/227; 422/24; 422/144; 422/145; 422/900; 422/186.3; 241/DIG. 38; 588/210; 588/212; 588/900; 204/157.4
[58] Field of Search ............... 422/24, 144, 145, 900, 422/186.3; 241/DIG. 38; 588/210, 212, 227, 251, 900; 204/157.4

[56] References Cited

U.S. PATENT DOCUMENTS

| | | | |
|---|---|---|---|
| 4,133,638 | 1/1979 | Healey | 422/37 X |
| 4,793,931 | 12/1988 | Stevens et al. | 422/186.3 X |
| 4,832,700 | 5/1989 | Kaspar et al. | 422/145 X |
| 4,869,433 | 9/1989 | Lewellin | 422/24 X |
| 4,882,021 | 11/1989 | Barnhart | 422/186.3 X |

*Primary Examiner*—Robert J. Warden
*Assistant Examiner*—E. Leigh Dawson
*Attorney, Agent, or Firm*—Wegner, Cantor, Mueller & Player

[57] ABSTRACT

The process for cleaning polluted solids by crushing the solids and removing the pollutants consists of mechanically fluidizing the crushed solids, through-blowing them with air and irradiating them with UV light, the air flow subsequently being subject to dust removal and irradiated with UV light again.

17 Claims, 1 Drawing Sheet

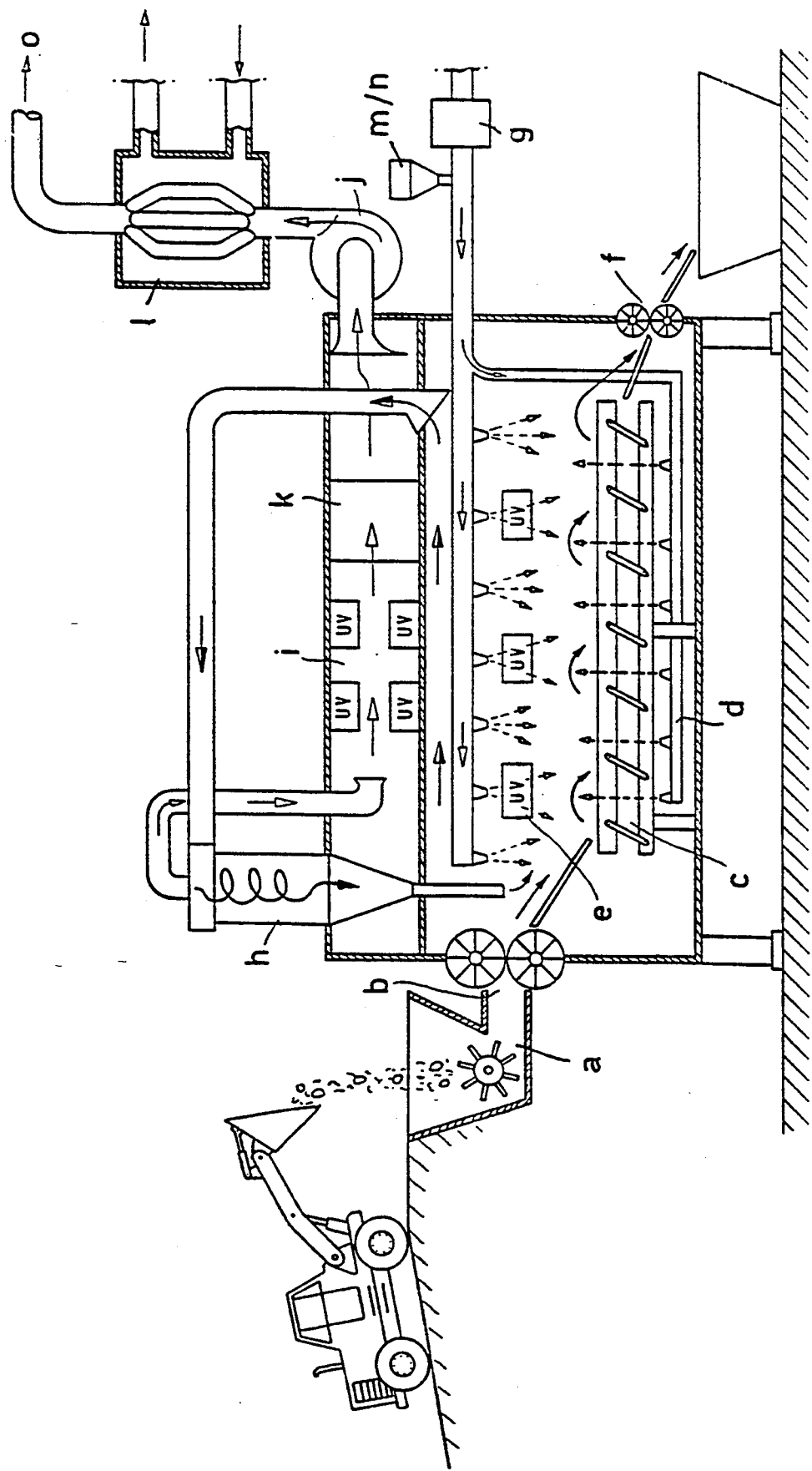

PROCESS AND DEVICE FOR CLEANING POLLUTED SOLIDS

FIELD OF THE INVENTION

The present invention is directed to a process for cleaning polluted solids, particularly soil, by crushing the solids and removing the pollutants. In addition, the invention relates to a device for conducting this process.

DESCRIPTION OF THE PRIOR ART

It is known from German DE-OS 39 03 549 to degrade pollutants, especially halogenated hydrocarbons, by using UV light. Initially, this process has been utilized for liquids. In principle, it is also suitable for treating gaseous effluents such as industry waste gas, etc.

U.S. Pat. No. 4,432,344 describes a process wherein focussed sunlight is used to degrade pollutants. Where solids are to be treated, mixing devices are to be installed. However, devices for crushing the solids are not provided.

In German DE-GM 87 04 276, there is described a device for removing halogenated hydrocarbons from natural water resources, soil and/or the atmosphere contaminated therewith, consisting of a closed casing having flow units for air and gas mixtures containing halogenated hydrocarbons, as well as UV light sources arranged as bundles of multiple tube-shaped UV radiators. Where soil is to be cleaned, a stream of air is pumped therethrough, and the discharging mixture of air and halogenated hydrocarbons is fed into the apparatus.

In practice, not only liquid and/or gaseous effluents are contaminated but very frequently solids as well. Predominantly, these solids are soil but, in addition, they are other solids as well such as ore, minerals, as well as powdered chemicals and intermediates. In most cases, contamination of such solids ensues unintentionally, and very frequently results from accidents or unintentional leaking of contaminants from storage or transportation tanks. Hitherto, it was necessary to dispose of these solids on special waste dumps or to extract them in expensive processes using washing liquids.

Once degradation of pollutants in gases and liquids by UV light had proven successful, it became desirable to apply this cleaning technique to polluted solids as well. However, such extended application is impeded by a number of problems which appeared to be unsolvable so that among artisans, it was initially assumed that general application of this technique to solids could not be considered at all.

The greatest problem is that solids generally are non-transparent to UV light so that degradation of pollutants is possible only on the exterior solid particle surface facing the UV light source. Even the lateral surfaces of particles and, in particular, the rear surfaces of particles cannot be exposed tow light easily. Furthermore, it would be necessary that not only the upper layer of the solid particles but each particle of a contaminated solid must be exposed to UV light from all sides. In particular, where pollutants have penetrated into the interior of the solids, it is imperative to sufficiently crush the solids prior to cleaning so that the pollutants will be located at the surface of the particles exclusively or at least almost exclusively. Even after such crushing, however, cleaning of polluted solids by UV light appeared to be impracticable, particularly for the reasons set forth above.

SUMMARY OF THE INVENTION

Now, it has been found possible, nevertheless, to solve this problem in such way that the crushed solids are mechanically fluidized, blown through with air, and irradiated with UV light, the air flow subsequently being freed from dust and irradiated with UV light again.

These combined measures result in degradation of pollutants adhering to the surface of solid particles and in partial uptake of pollutants into the air flow. In order to remove the pollutants contained in the air flow, it is necessary, therefore, to subject this air to a UV irradiation as well.

In addition to sufficient crushing and mechanical fluidizing, it is necessary to remove dust from the air flow prior to another irradiation by UV light, since otherwise degradation of pollutants in the air flow will be incomplete. Furthermore, the dust within the air flow gives rise to rapid soiling of the UV lamps so that they lose efficiency. Thus, prior to blowing through the solids, the air flow preferably is used to clean the dust from UV lamps. Furthermore, it is advantageous to use this air flow for cooling rheum; lamps and/or the fluidized crushed solids. This measure not only prevents local overheating and cutting short UV lamp life but also permits controlling and regulating the process conditions with respect to average temperature within the system.

Furthermore, it has proven convenient to collect the dust portion of the air flow and recycle it to the crushed solids. Although, in principle, separate discharge of this dust portion from the process and separate further processing is possible, these additional measures are not required if the dust, for instance, is recycled to the uncleaned solids portion.

It has proven especially effective to suck the air flow at least partially through the crushed and mechanically fluidized solids. Due to this reduction in pressure, a larger portion of volatile contaminants is transferred to the air flow, and there may be removed by UV light in a per se known manner.

In principle, fluidizing can be effected using such an air flow. Likewise, such a fluid bed, in principle, may be irradiated with UV light. In general, however, the ratio of amounts of solids to amount of air tends to be too unfavorable. Therefore, fluidizing preferably is accomplished by shaking or vibrating plates. Air suction through the solids fluidized in this fashion is preferably ensured by feed inlets through which air may be sucked. On the other hand, it is also possible, in principle, to feed the air to be sucked through from the side only and to abandon feed inlets in the shaking or vibrating plates.

It has proven reasonable to filter or even wet-clean the fresh air by washing before it is fed into the system and thus, into the crushed and fluidized solids, in order to prevent new environmental contaminants from being introduced into the solids. Anyway, in order to prevent undesirable air pollution, it is recommended to filter and/or even wash the air subsequently treated with UV light, before it discharges into the environment.

Depending on the type of contamination and other process conditions, it may be very useful to spray the crushed and mechanically fluidized solids with auxiliary chemicals. Here, hydrogen peroxide has proven especially successful in some cases. Similarly, spraying with acetic acid has increased the cleaning effect in other cases. It has also proven extraordinarily useful and is technically easy to accomplish by adding ozone or additional oxygen to the air flow, since degradation of pollutants on irradiating with UV light represents an activated oxidation and hence, may consume oxygen or ozone in considerable amounts. In principle, the process of the invention may be conducted batchwise. However, continuous operation is preferred.

BRIEF DESCRIPTION OF THE DRAWING

FIG. 1 is a schematic representation of a device useful according to the invention. This drawing further shows the flow diagram for crushed solids, fresh air and outlet air. It also indicates where fluidized solids and dust-free outlet air are exposed to the UV radiation.

DETAILED DESCRIPTION OF THE PREFERRED EMBODIMENT

For continuous process operation, with reference to FIG. 1 the device of the invention generally consists of
a) devices for coarse and fine crushing of the solids,
b) a feed opening designed as an air lock for the crushed solids,
c) a device for mechanical fluidizing the crushed solids,
d) a device for blowing air through the crushed and fluidized solids,
e) a device for irradiating the crushed and fluidized solids with UV light,
f) a discharge opening designed as an air lock for the irradiated solids,
g) a fresh air feed opening optionally provided with a filter,
h) a device for removing dust from the air discharging through the crushed, fluidized and irradiated solids,
i) a device for irradiating the dust-freed air with UV light,
j) a device for sucking off the air treated with UV light,
k) an optional filter for the outlet air discharging from suction,
l) an optional heat exchanger for the discharging outlet air,
m) an optional device for spraying the fluidized solids with auxiliary chemicals,
n) an optional device for admixing ozone or oxygen to the air flow,
o) an optional washing device for the discharging outlet air.

The device for the mechanical fluidizing of the crushed solids preferably is designed as a shaking or vibrating plate and has optional borings acting as feed openings for the air.

The device for dust removal from the air discharging through the crushed, fluidized and irradiated solids preferably is designed as a cyclone. In such cases, it is also especially simple to recycle the portion of dust from the air to the crushed solids.

Prior to dust removal, in order to keep the portion of dust in the air as low as possible, it is recommended to arrange at least a few feed openings for air above the fluidized solids. Preferably, there are generated turbulent counter-currents against the slower air flow discharging from the plates. In most cases, however, dust removal by a cyclone is sufficient.

It must be regarded as a substantial advantage of the invention that it is possible to integrate at least those elements from air lock to admixture of ozone or oxygen to the air flow, resulting in a compact constructional unit, and to accommodate them in a mobile container. Then, such a mobile container Just has to be combined with conventional or specifically developed devices for coarse and fine crushing of the solids. In the case of solids where these steps may be conducted in easy and uncomplicated fashion, these aggregates could also be accommodated in the container. Likewise, it is possible, in principle, to further accommodate a washing device for the discharging air. Generally, it is more convenient, however, to employ a second mobile unit for this purpose, which, depending on type and extent of contamination, has higher or lower efficiency, thus ensuring that the environment will not be polluted by the outlet air once again.

Use of a heat exchanger is always recommendable in those cases where the heat can be utilized reasonably. In some cases, using the waste heat thus recovered, it may even be reasonable to preheat the fresh air because it then has a higher capacity for evaporative contaminations. However, where heat-sensitive solids are concerned, precooling of introduced fresh air may be reasonable instead. Then, however, the energy for cooling the fresh air may likewise be recovered from the waste heat of the heat exchanger.

As for the UV lamps, in principle, all commercially available UV lamps can be applicable which have been used for treating liquid and gaseous effluents up to now. For the irradiation of solids, the use of special constructions may be reasonable, where an increased flow of fresh air is directed in such way as to cause effective cooling and cleaning of the UV radiators.

What is claimed is:

1. Process for cleaning polluted solids comprising the steps of:
   crushing the solids, mechanically fluidizing the crushed solids, blowing air through the crushed solids, irradiating the crushed solids with UV light, and subsequently removing dust from the air flow and irradiating the air flow with UV light.

2. The process according to claim 1, further comprising using the air flow in advance to clean dust from the UV lamps.

3. The process according to claim 1, further comprising using the air flow to cool the UV lamps.

4. The process according to claim 1, further comprising recycling the dust portion of the air flow to the crushed solids.

5. The process according to claim 1, further comprising sucking the air flow through the crushed and mechanically fluidized solids.

6. The process according to claim 1, further comprising filtering the air prior to introduction into the crushed, fluidized solids.

7. The process according to claim 1, further comprising spraying auxiliary chemicals onto the crushed and mechanically fluidized solids.

8. The process according to claim 1, further comprising admixing ozone or oxygen into the air flow.

9. The process according to claim 1, further comprising using the air flow to cool the fluidized crushed solids.

10. The process according to claim 1, further comprising washing the air prior to discharge into the environment.

11. The process according to claim 1, further comprising filtering the air prior to discharge into the environment.

12. Device for cleaning polluted solids by crushing the solids and removing the pollutants by mechanically fluidizing the crushed solids, blowing air through the fluidized crushed solids and irradiating them with UV light, the air flow subsequently being subjected to dust removal and irradiation with UV light again; comprising a) means for coarse and fine crushing of the solids and means for passing the solids from the coarse and fine crushing to a feed opening,
b) an air lock feed opening for the crushed solids,
c) a means for mechanical fluidizing the crushed solids,
d) a means for blowing air through the crushed and fluidized solids,
e) a means for irradiating the crushed and fluidized solids with UV light,
f) means for passing the irradiated solids to a discharge airlock opening for discharging the irradiated solids,
g) a fresh air feed opening into the device optionally provided with a filter,
h) a means for removal of dust from the air discharging through the crushed, fluidized and irradiated solids,
i) a means for irradiating the air from which the dust has been removed with UV light,
j) a means for discharging the irradiated air from which the dust has been removed, from the device.

13. Device according to claim 12, wherein means c) is a shaking or vibrating plate optionally having air feed openings.

14. Device according to claim 12, wherein means h) is a cyclone recycling the dust portion to the crushed solids.

15. Device according to claim 12, wherein air feed openings are arranged above the fluidized solids.

16. The process according to claim 12, further comprising k) a filter for the outlet air discharging from the device,
l) a heat exchanger for the discharging outlet air,
m) a means for spraying the fluidized solids with auxiliary chemicals,
n) a means for admixing ozone or oxygen with the air blowing through the crushed and fluidized solids, and,
o) a washing means for the discharging irradiated air from which the dust has been removed.

17. Device according to claims 12, wherein at least elements b) to j) are accommodated in a mobile container.

* * * * *